Figure 1:
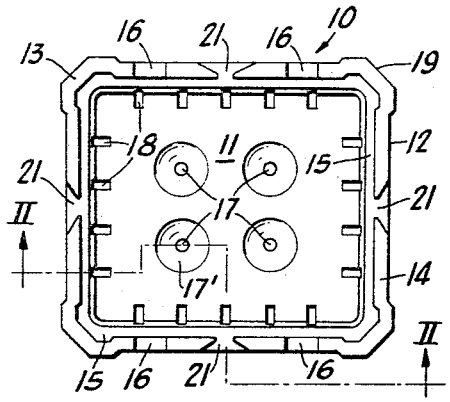

July 18, 1967  J. SLAPNIK  3,331,529
STACKABLE MOLDED PLASTIC CONTAINERS
Filed Feb. 7, 1966  2 Sheets-Sheet 1

INVENTOR.
JOSEPH SLAPNIK
BY William G. Kratz, Jr.
his Agent

July 18, 1967   J. SLAPNIK   3,331,529
STACKABLE MOLDED PLASTIC CONTAINERS
Filed Feb. 7, 1966   2 Sheets-Sheet 2

INVENTOR.
JOSEPH SLAPNIK
BY William G. Kratz, Jr.
his Agent

United States Patent Office 3,331,529
Patented July 18, 1967

3,331,529
STACKABLE MOLDED PLASTIC CONTAINERS
Joseph Slapnik, Arcadia, Calif., assignor to Koppers Company, Inc., a corporation of Delaware
Filed Feb. 7, 1966, Ser. No. 525,551
7 Claims. (Cl. 220—97)

This application relates generally to a plastic container, and more specifically, to a container molded from low density plastic material and especially adapted for the transportation of perishable items.

Cardboard containers for the shipment of wholesale produce have the disadvantage that the ice used for the protection of the produce melts and the resulting water weakens and ruins such cardboard containers. The problem is not present with wood containers, but wooden containers are fabricated with stapes, nails, or other fasteners, which sometimes exposes dangerous edges. Also, in shipment, produce is readily bruised or broken due to the hard surface exposed by wooden containers damaging the contents during shipment.

In accordance with this invention there is provided a container molded from low density plastic foam material that is excellently suited for use in shipment of perishable and fragile items.

The container of this invention is fabricated from a low density foamed plastic material. The light weight of the container reduces transportation costs in shipment of produce, and the plastic material being a non-contaminating material, is inert and not susceptible to chemical action, fungus growth and the like. The cushioning effect of the low density plastic material and the absence of any sharp or hard edges in any portion of the container also makes the container well suited for the shipment of fragile items.

The container of this invention has a configuration which enables the stacking of containers one upon another whether the containers be open or closed by a lid. The configuration provides excellent ventilation for the contents of the container regardless of whether the containers are stacked or are placed side by side. In addition to ventilation, the container provides for drainage of water, when ice is used to protect perishable items, and for the dispersion of such water throughout the container and its contents when the ice water flows from the top container of a stack of such containers downwardly through those below. The container can be produced in various sizes and colors to provide a pleasing appearance that readily gains consumer acceptance.

Briefly, the container of this invention comprises a body portion having a space therein for the placement of items to be transported. The body is closeable alternatively by either another container body or a lid. The unitary molded body comprises a bottom and four upstanding side walls with thickened portions at the juncture of adjacent sides comprising corner posts. These corner posts are upwardly and outwardly extending from the bottom to the top of the walls, and protrude outwardly from the juncture of the side walls. Lips at the top of the walls and corner posts extend upwardly and outwardly of form a protected ledge situated around the top inside circumference of the body; the ledge having dimensions which conform with the bottom of the body to permit resting of a container bottom on the ledge. The ledge and lips are slotted to provide drainage and ventilation. The side walls and bottom of the container have mutually intersecting slots for the same purpose.

The lid for the container is fitted with locking portions which mate with outwardly diverging openings in the lips at the top of the container, whereby the lid is secured to the container. The top outside circumference of the lid has a rim which conforms with the bottom of the container and provides for the stacking of another container upon the lid. This rim is also provided with slots to allow drainage and ventilation when a container is resting in the rim of the lid.

The advantages of this invention will become apparent from the following description taken in conjunction with the accompanying drawings wherein the preferred embodiments of my invention are set forth by way of illustration and example.

Figure 2:
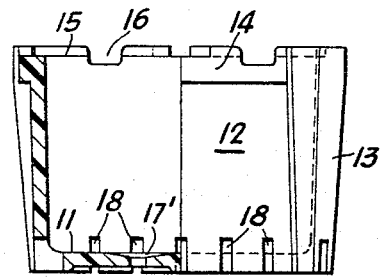
Figure 3:
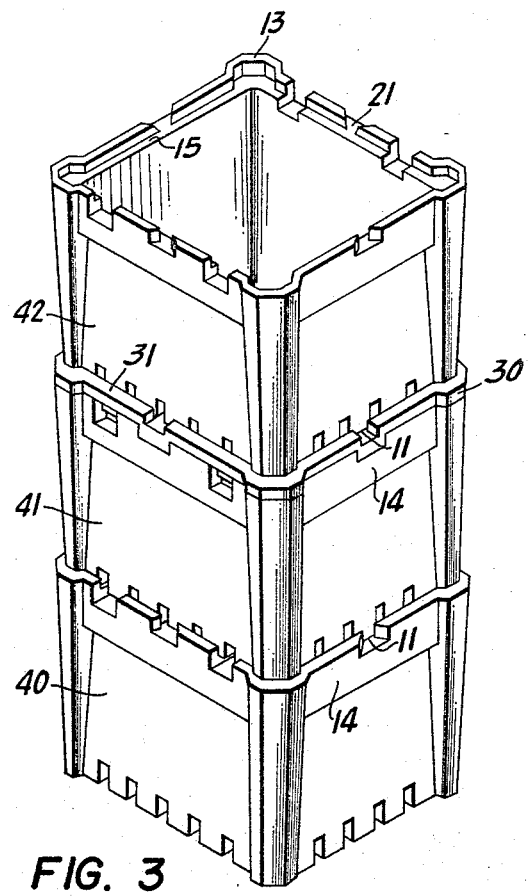
Figure 4:
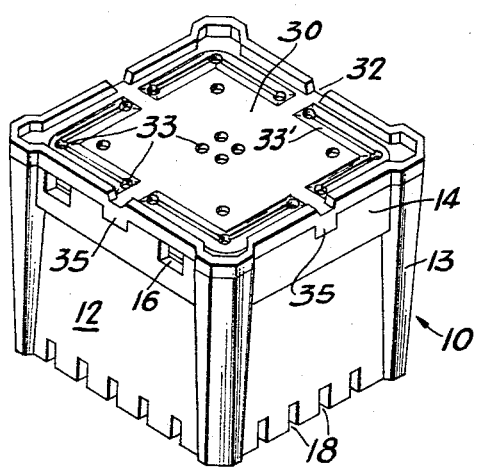
Figure 5:
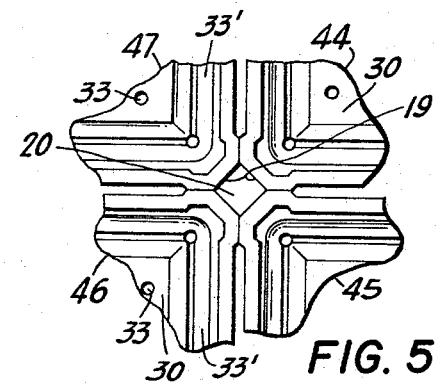
Figure 6:
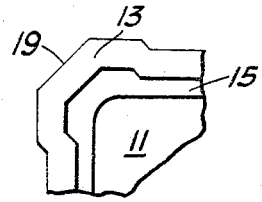
Figure 7:
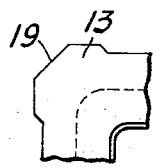
Figure 8:
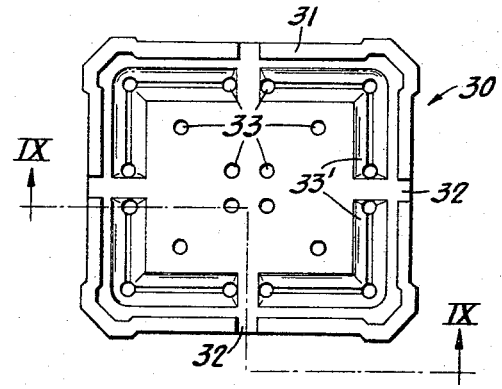
Figure 9:
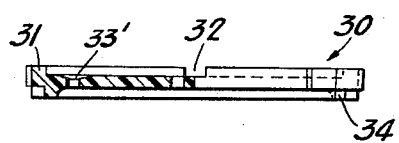
Figure 10:
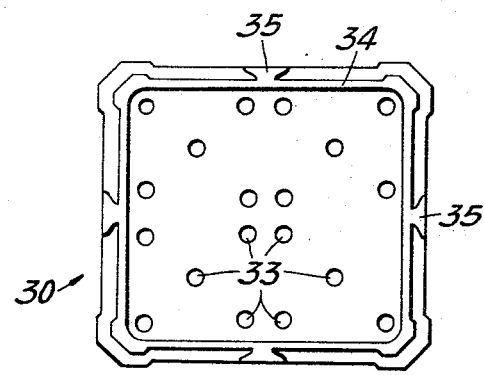

In the drawings wherein like parts are marked alike:
FIGURE 1 is a top plan view of an embodiment of the container of the invention.
FIGURE 2 is a partial cross-section of a side elevational view of the container taken along II—II of FIGURE 1.
FIGURE 3 is a perspective view of a plurality of the containers of FIGURE 1 stacked one upon the other, showing one container with and two without lids.
FIGURE 4 is a perspective view of the container of FIGURE 1 with the lid of FIGURE 8 in place.
FIGURE 5 is a fractional view of four containers such as in FIGURE 1, with lids thereon, placed side by side and centered around a common point particularly illustrating the vertical chimney formed to allow for ventilation when containers are stacked in a small area.
FIGURE 6 is an enlarged view of a top corner of the container of FIGURE 1.
FIGURE 7 is an enlarged underside view of the bottom corner of the container of FIGURE 1.
FIGURE 8 is a top plan view of the lid of FIGURE 4.
FIGURE 9 is a partial cross-sectioned side view of the lid along IX—IX of FIGURE 8, and
FIGURE 10 is a view of the underside of the lid of FIGURE 8.

Referring to FIGURES 1 and 2, there is shown the container body 10 with its bottom 11 and the four upstanding side walls 12, which are generally normal to the bottom, and comprised of a unitary molded structure. At the juncture of two adjacent side walls, which are generally normal to each other, are thickened portions which form corner posts 13. As illustrated in FIGURE 2, these corner posts 13 extend upwardly and outwardly from the bottom to the top of the side walls 12. The side walls 12 are generally normal to the bottom.

The tops of each of the side walls 12 and the corner posts 13 terminate in lips 14 which extends upwardly and outwardly from the side walls. Each lip is indented however with respect to the outside surface of the corner posts. The lip 14 forms a protected ledge 15 which extends around the top interior circumference of the body 10. This ledge 15 conforms with the dimension of the container bottom 11 whereby the bottom of one container can rest on the ledge of another container. This enables the stacking of a plurality of containers, one upon another, and also forms a resting place for the lid 30 which may alternately be used with the container. Slots 16 are formed in the lip 14 and ledge 15 of the side walls to permit ventilation when one container is stacked upon another or when a lid is placed on the container.

The bottom 11 of the container may also have apertures 17 therein for the purpose of ventilation and drainage of liquid coolant. These apertures are conveniently countersunk as illustrated at 17', FIGURE 2, in the bottom to facilitate the flow of liquid coolant such as ice water to the apertures and out through the bottom of the conainer.

Also for the purpose of drainage and ventilation, there are formed mutually intersecting slots 18 in the bottom 11 and side walls 12. These mutually intersecting slots form continuous slots extending into both the side walls and bottom.

A container 10 is fitted with lid 30 as shown in FIGURE 4. A plurality of containers may be stacked as in FIGURE 3. Container 40 is closed by the bottom 11 of container 41 which rests in the ledge 15 of lip 14. The middle container 41 is closed by a lid 30 and the bottom 11 of the uppermost container 42 rests within the rim 31 of the lid. Containers can, thus, be stacked either with or without a lid in place.

The corner posts 13 are preferably designed to have a flat surface 19 on the outer side, FIGURE 6. This flat surface provides an open space between containers when they are placed around any designated point. As shown in FIGURE 5, a vertical chimney 20 is formed when four containers with lids 44, 45, 46, and 47 are placed side by side with corner posts 13 in contact. Chimney 20 extends from the level of the bottom container to the top of the uppermost container when stacks of the containers are so positioned and serves to ventilate the stacks of the containers. Ventilation space is also provided between the sides of adjacent containers because of the protrusion of the touching corner posts.

As seen from the underside of the container, FIGURE 7, the configuration enables the bottom corner to fit securely and rest upon the ledge 15 of another container when stacking the container in a vertical stack.

When the container, FIGURE 1, is to be closed by a lid, the lips 14 of each of the side walls have an opening 21 which is outwardly diverging from the ledge 15 to the outer side of the lip. These outwardly diverging openings 21 secure lid 30 in place by the mating of portions 35 of the lid in said openings. The lid 30 is also molded from low density foam plastic material and facilitates drainage and dispersion of ice water and enables the stacking of a container upon a lid which closes a container below. Lid 30, FIGURE 8, shows a rim 31 which extends around the outer circumference of the top of the lid, the interior of said rim shaped to conform with the bottom 11 of the container body. This conformity enables the stacking of a container upon the lid with the bottom edge of the corner posts 13 and side walls 12 securely seated within said rim. The rim 31 has slots 32 therein to enable ventilation and drainage when a container is secured on said lid. Also, apertures 33 may be formed in the lid to enable drainage and dispersion of liquid coolant from a container bottom resting on the lid, through the lid and the contents beneath.

Linking the apertures 33 are grooves or channels 33' formed in the upper side of the lid 30 which disperse the ice-water, which flows from a container stacked on said lid and is held within the rim 31, so that the ice-water is evenly distributed through apertures 33 and throughout the contents of the container improving cooling efficiency.

The downwardly extending ridge 34, FIGURES 9 and 10, on the underside of the lid is adapted to rest on ledge 15 of the container when a container is closed with said lid. This ridge 34 is situated a predetermined distance from the outer circumference of the underside of the lid to enable seating of the lid upon the container. The ridge 34 has outwardly diverging portions 35 which are adapted to fit securely into the outwardly diverging openings 21 of the container to secure the lid in place when closing the container with a lid.

It is to be understood that the material utilized in the construction of the container of my invention may be any suitable foamed plastic material. Preferably, the container is molded from expandable polystyrene such, for example, as that sold under the trademark Dylite. The molding of expandable polystyrene is well known and is described, for example, in the article, "Expandable Polystyrene," by Edwin A. Edberg in Modern Plastics, Encyclopedia Issue, September 1957, pp. 347–350.

There has been described a container which may be stacked in a column where individual containers are closed with a lid, or if without a lid are closed by another container. The configuration of the container is such that the weight of containers stacked one upon another is absorbed by the walls of containers below which are aligned as columns. When stacked, the containers are provided with adequate ventilation regardless of their position to each other because of the projection of the corner posts.

I claim:
1. A container for the shipment of perishable produce comprising:
a unitary body molded of low density expanded plastic material and having a bottom and four side walls, said walls being generally normal to the bottom, adjacent walls being generally normal to each other, and defining a space for said produce, thickened portions at the juncture of each of said side walls constituting corner posts, said corner posts extending upwardly and outwardly from said bottom to the top of said walls and protruding outwardly from the juncture of said side walls, said side walls and corner posts terminating in lips which extend outwardly and upwardly from said side walls to form a protected ledge around the interior circumference of said side walls, said ledge having the dimensions of said bottom whereby said ledge can nest the bottom of another body for stacking of bodies, said ledge and lips having slots for ventilation, and said side walls and bottom having mutually intersecting slots for ventilation and drainage.

2. The container of claim 1 wherein said bottom has apertures therein for drainage purposes.

3. The container of claim 1 wherein said corner posts have a relatively flat exterior surface with respect to the juncture of said adjacent sides.

4. The container of claim 1 wherein each of said lips has an opening, diverging outwardly from the inner ledge to the outer side, and a lid adapter to fit and rest on said ledge and lip, said lid having portions mating with said lip opening to secure said lid when placed upon said body.

5. The container of claim 4 wherein the upper side of said lid includes a rim conforming to the configuration of said bottom whereby a body can rest on said lid.

6. The container of claim 5 wherein said rim is slotted for the purpose of drainage and ventilation.

7. The container of claim 5 wherein the lid has apertures and grooves therein whereby liquid coolant reaching said lid is dispersed evenly throughout the container.

References Cited

UNITED STATES PATENTS 3,117,692   1/1964   Carpenter et al. _____ 220—23.6
3,303,965   2/1967   Parker et al. _____ 220—97
3,310,218   3/1967   Reifers et al. _____ 220—23.6

THERON E. CONDON, *Primary Examiner.*

R. H. SCHWARTZ, *Assistant Examiner.*